(12) United States Patent
Phillips

(10) Patent No.: US 6,183,633 B1
(45) Date of Patent: Feb. 6, 2001

(54) SEPARATOR

(75) Inventor: Donald Ian Phillips, Bayswater North (AU)

(73) Assignee: Swinburne University of Technology, Hawthorn (AU)

( * ) Notice: Under 35 U.S.C. 154(b), the term of this patent shall be extended for 0 days.

(21) Appl. No.: 09/011,494

(22) PCT Filed: Jul. 26, 1996

(86) PCT No.: PCT/AU96/00468

§ 371 Date: Mar. 11, 1998

§ 102(e) Date: Mar. 11, 1998

(87) PCT Pub. No.: WO97/05338

PCT Pub. Date: Feb. 13, 1997

(30) Foreign Application Priority Data

Jul. 28, 1995 (AU) .................................................. PN4442
Dec. 7, 1995 (AU) .................................................. PN7026
Mar. 19, 1996 (AU) .................................................. PN8785

(51) Int. Cl.[7] ............................. B01D 36/00; E03F 5/14
(52) U.S. Cl. .................... 210/170; 210/121; 210/242.1; 210/154; 210/156; 210/302; 210/304; 210/305; 210/311
(58) Field of Search ....................... 210/121, 242.1, 210/154, 156, 302, 304, 305, 311, 170

(56) References Cited

U.S. PATENT DOCUMENTS

| | | | |
|---|---|---|---|
| 48,841 | * | 7/1865 | Scoville . |
| 2,754,179 | | 7/1956 | Whatley . |
| 3,460,677 | | 8/1969 | Fifer . |
| 3,510,001 | | 5/1970 | Baer et al. . |
| 3,815,742 | * | 6/1974 | Dubouchet . |
| 3,834,539 | * | 9/1974 | Thompson . |
| 3,904,524 | | 9/1975 | Pelton et al. . |
| 3,951,817 | | 4/1976 | Snyder . |
| 4,110,216 | * | 8/1978 | Wagnon et al. . |
| 4,224,156 | | 9/1980 | Pardikes et al. . |
| 4,251,486 | | 2/1981 | Sohda . |
| 4,377,477 | | 3/1983 | Dunkers . |
| 4,789,470 | * | 12/1988 | Wards . |
| 4,801,377 | | 1/1989 | Bolt . |
| 4,876,004 | | 10/1989 | Verhoeff . |
| 4,892,651 | | 1/1990 | Hill . |
| 5,249,887 | | 10/1993 | Phillips . |
| 5,595,457 | * | 1/1997 | Stucks . |

FOREIGN PATENT DOCUMENTS

| | | |
|---|---|---|
| 628745 | 12/1991 | (AU) . |
| 0602329 | 6/1994 | (EP) . |
| 0414341 | 2/1997 | (EP) . |
| 57-165513 | 10/1982 | (JP) . |
| 1182112 | 9/1985 | (SU) . |
| 1497350 | 7/1989 | (SU) . |
| 94/17896 | 8/1994 | (WO) . |

OTHER PUBLICATIONS

Copy of PCT International Search Report 3 Pages.
Copy of PCT Written Opinion 5 Pages.

* cited by examiner

Primary Examiner—Thomas M. Lithgow
(74) Attorney, Agent, or Firm—Fish & Richardson PC

(57) ABSTRACT

A separator for separating material from a fluid which includes an inlet, a separating chamber in fluid communication with the inlet, a holding chamber, a deflector for deflecting material entrained in or moving with fluid entering the separating chamber from the inlet towards the holding chamber, and an outlet for permitting flow of fluid from which the material has been removed from the separating chamber.

20 Claims, 18 Drawing Sheets

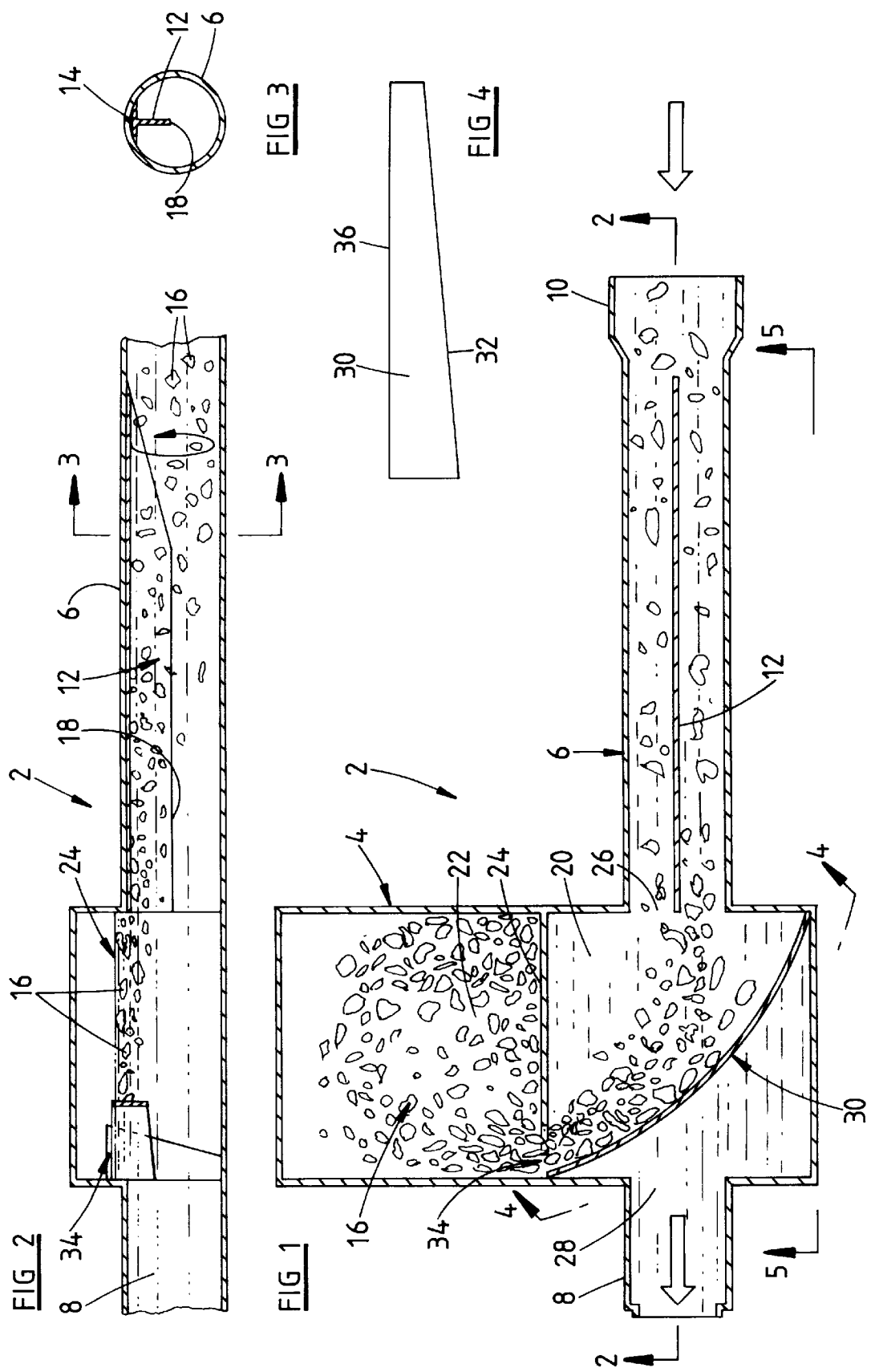

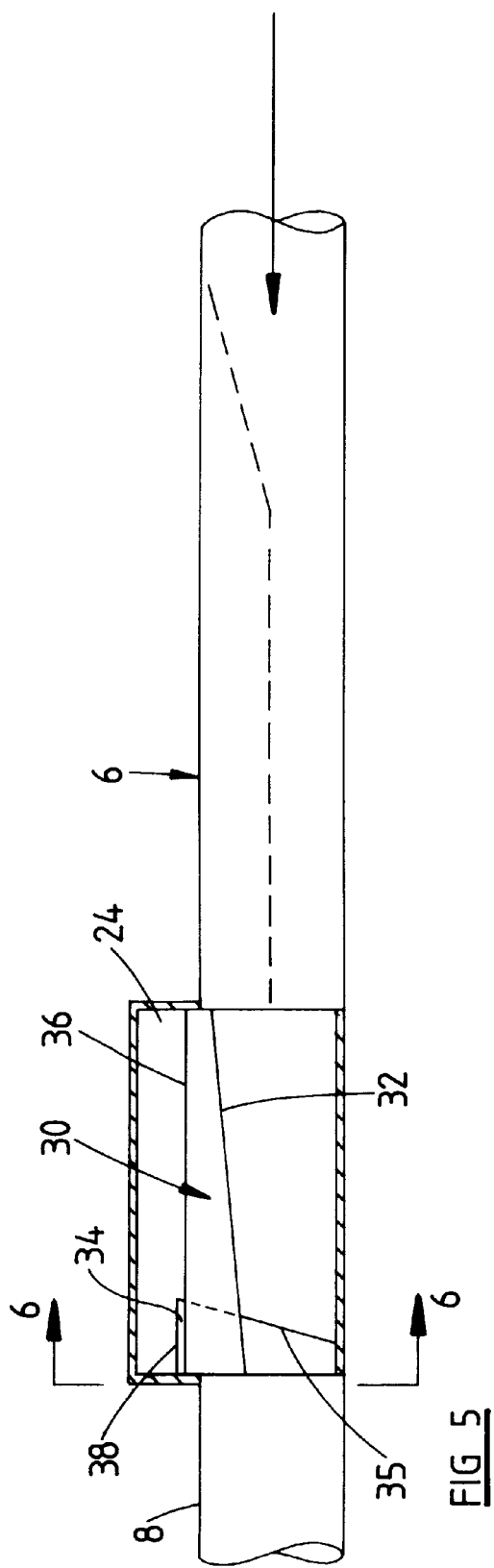
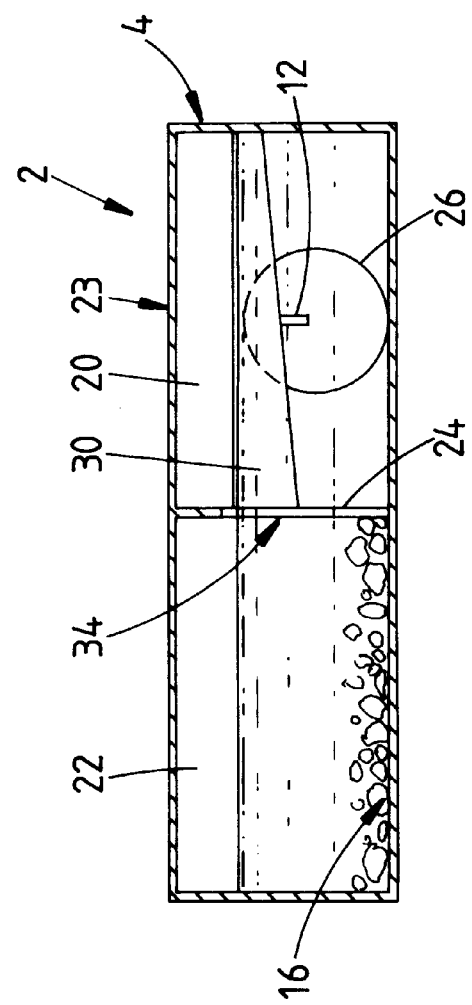
FIG 5
FIG 6

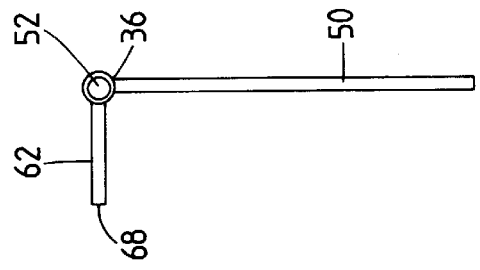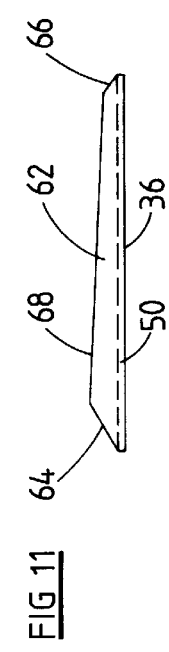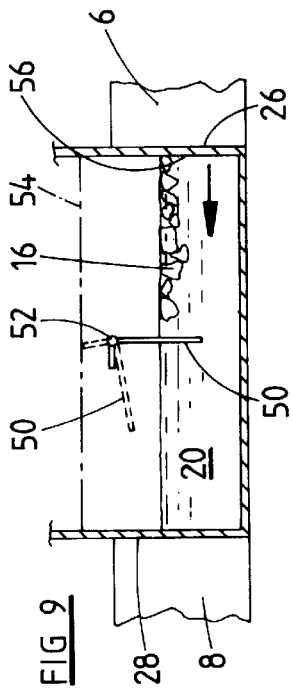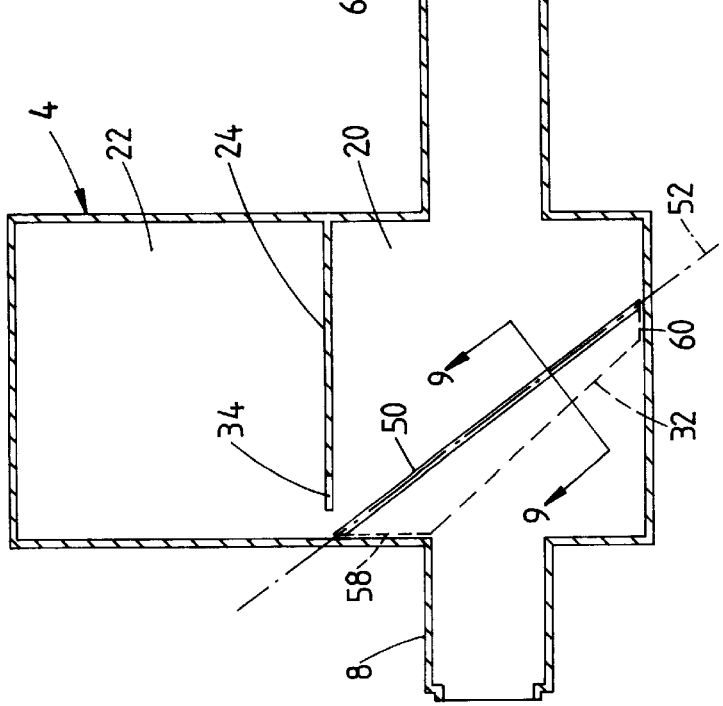

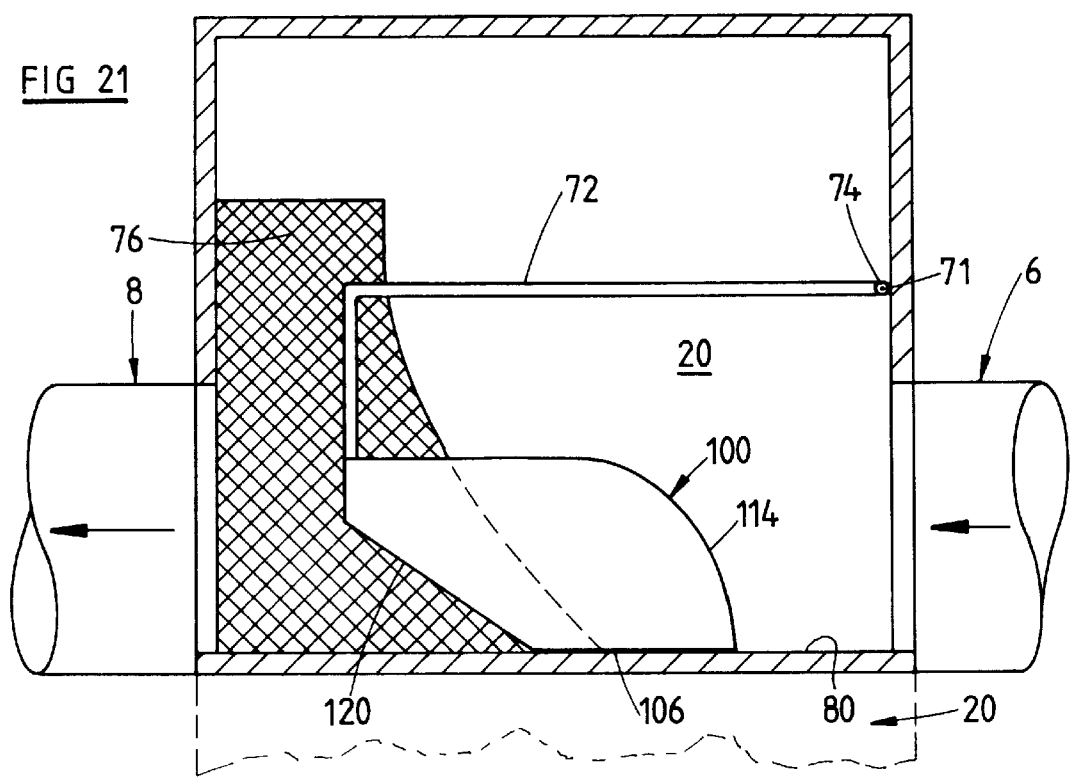
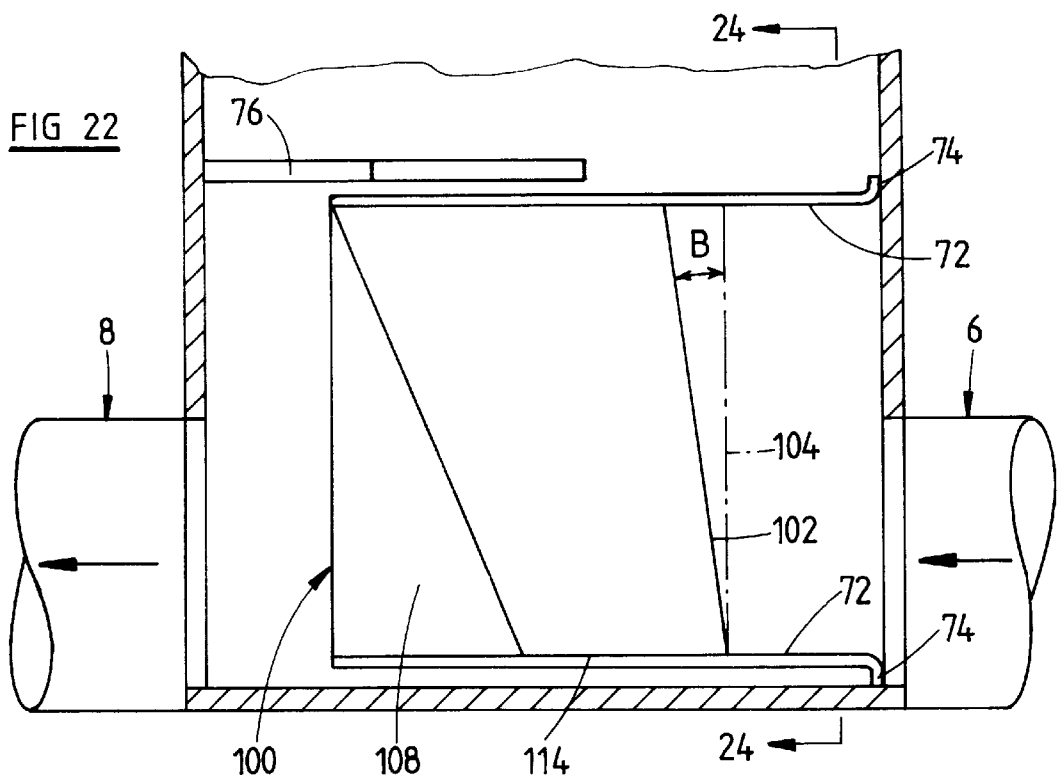

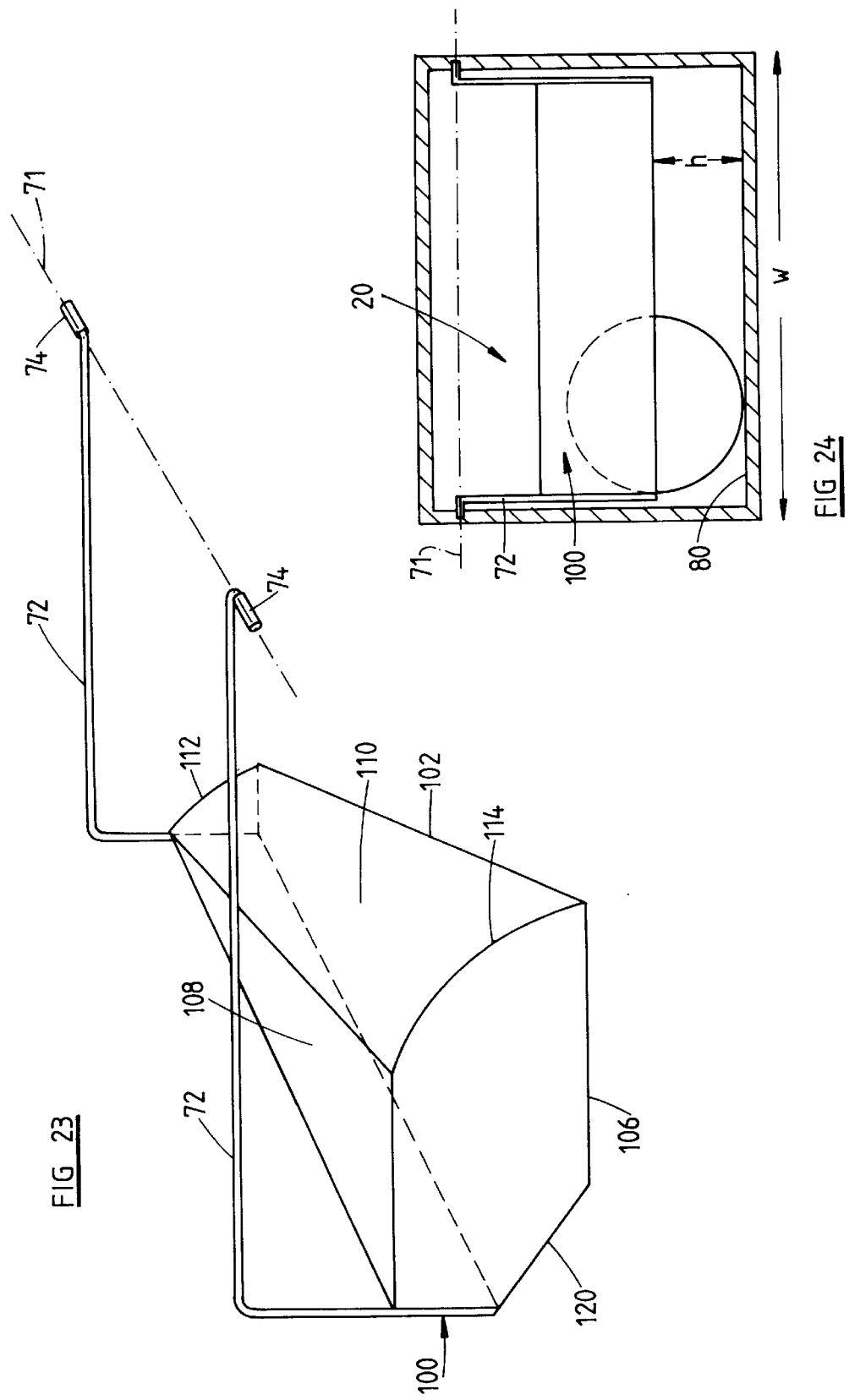

SEPARATOR

This invention relates to a separator.

More particularly, the invention relates to a separator for separating material from a moving fluid. The material may comprise a solid body whether buoyant or non-buoyant. Alternatively, the material may comprise a fluid or fluid-like material such as oil, scum, grease, fats and other similar substances. The expression also is intended to cover materials such as heavy fluids or sludges which are heavier than the moving fluid.

More particularly, the invention relates to a separator for separating bodies from a fluid.

In storm water drainage systems, it is desirable to remove debris from the storm water before it is discharged into rivers, lakes and the like. Floating debris can be a particular problem because accumulation of floating debris in rivers and streams badly degrades the environment. It is desirable therefore to try to remove debris, particularly floating debris, from the storm water and this is usually accomplished by means of traps which basically attempt to trap floating particles from the storm water by the use of meshes, grates or the like but these components tend to clog up thereby reducing their effectiveness.

An object of the invention is to provide a separator which at least partially overcomes the problem noted above. The separator of the invention may find application in other areas where it is necessary to separate bodies from fluids.

According to the present invention there is provided a separator for separating material from a fluid, said separator comprising:

an inlet;

a separating chamber in fluid communication with the inlet;

a holding chamber;

deflecting means for deflecting material entrained in or moving with fluid entering the separating chamber from said inlet towards said holding chamber, and an outlet for permitting flow of fluid from which said material has been removed from the separating chamber.

In accordance with a preferred embodiment of the invention, the deflecting means comprises a boom which is mounted generally transversely or obliquely relative to the direction of flow of the fluid.

In this form of the invention, the boom may comprise a buoyant body. The body may be cylindrical in shape or have a curved frontal face and mounting means is provided to mount the body for rotational movement as the level of fluid increases and decreases.

Preferably further, the buoyant body is arranged to be about three-quarters submerged when fluid is flowing through the separator.

Preferably further, the buoyant body rests on a bottom floor of the separator body when no fluid or insufficient fluid is flowing therethrough to float the boom. In this case, the boom can operate to deflect non-floating bodies towards the second chamber which comprises a collection hopper.

The invention also provides a separator for separating bodies from a fluid, the separator having a generally rectangular separator body the separator body being formed with an inlet and an outlet characterised in that the inlet is located at or adjacent to a lower corner of the body.

Preferably the inlet is inclined to the major axis of the rectangular body at an angle. Preferably the angle is in the range 15° to 45°. Preferably, the angle is 22.5°.

Alternatively, the boom, inlet and outlet may be transverse to the body but the boom is provided with a curved, inclined frontal face.

The invention also provides a separator for separating bodies from fluid, said separator having a separator body through which flows in use a fluid having bodies entrained therein from an inlet to an outlet, and deflecting means to deflect bodies in said fluid away from said outlet, characterised in that the deflecting means comprises a boom which is in cross-section a quadrant shape.

In the specification, the expression "material" is intended to embrace solid bodies whether floating or not, floating layers of fluid materials such as oils, grease, scum or the like, and layers of fluids or fluid-like substances which are carried with the moving material near or at lower layers thereof.

The invention will now be further described with reference to the accompanying drawings, in which:

FIG. 1 is a schematic plan view of a separator;

FIG. 2 is a schematic sectional view along the line 2—2;

FIG. 3 is a cross-section along the line 3—3;

FIG. 4 is a side view of the deflector plate taken along the line 4—4;

FIG. 5 is a side view partly in section along the line 5—5;

FIG. 6 is a sectional view along the line 6—6;

FIG. 7 shows a modified separator;

FIG. 8 is a side view of the deflecting plate;

FIG. 9 is a fragmentary view along the line 9—9;

FIG. 10 is a cross-sectional view along the line 10—10;

FIG. 11 is a plan view of the alternative deflecting plate;

FIG. 21 is a schematic side view of another embodiment of the invention;

FIG. 22 is a plan view of the embodiment shown in FIG. 21;

FIG. 23 is a fragmentary perspective view of the boom of the embodiment shown in FIGS. 21 and 22;

FIG. 24 is a schematic sectional view along the line 24—24;

Figure 12:
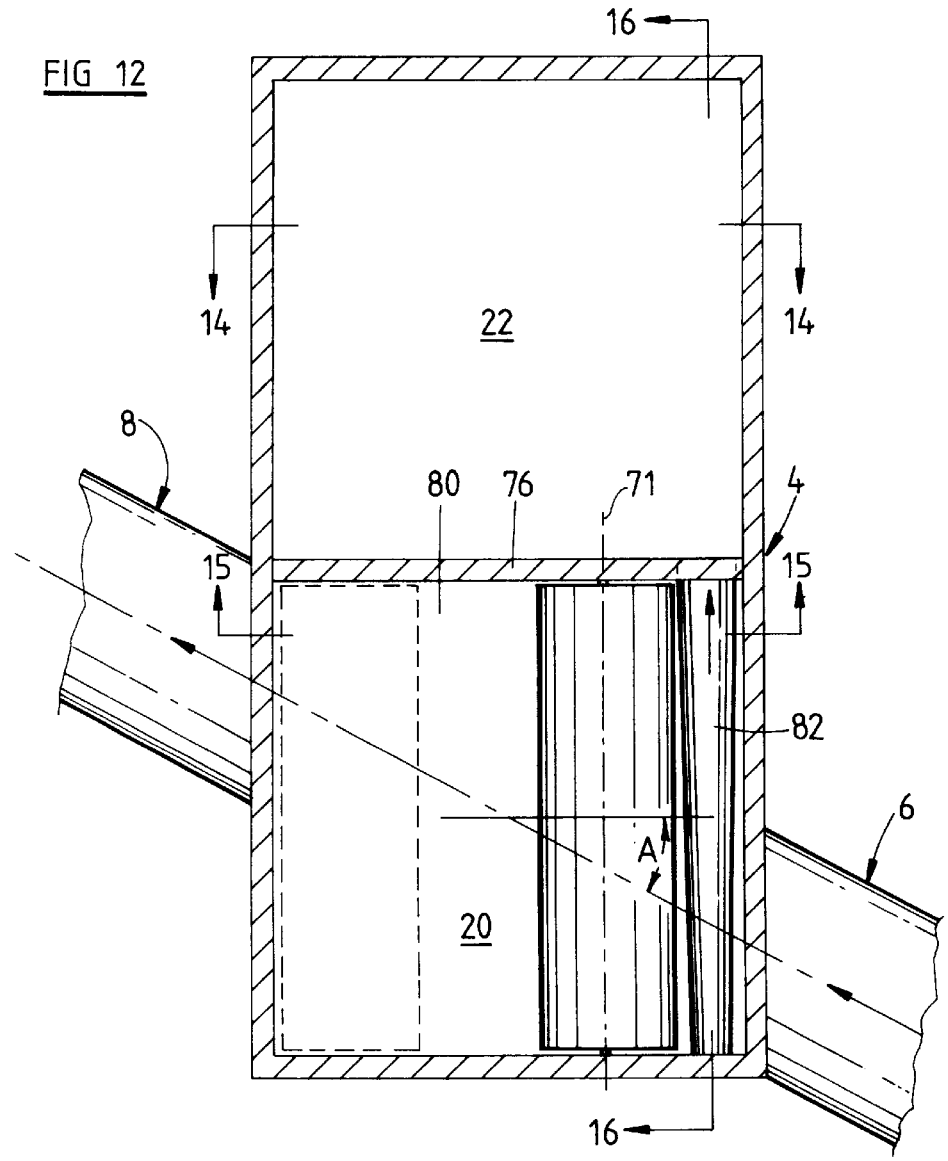
FIG. 12 is a schematic plan view of an alternative embodiment.

The separator 2 illustrated in FIGS. 1 to 6 is constructed so as to remove floating debris from storm water pipes. The separator 2 includes a chamber portion 4, inlet and outlets 6 and 8. The inlet and outlet may be formed as an inlet conduit and outlet spigot for connecting in an existing conduit system such as a storm water drain. These components are preferably moulded as a concrete pit and may be integrally formed. In the preferred form of the invention, the inlet 6 includes an inlet socket 10 and the overall length of the separator 2 is the same as the nominal length of pipes in a storm water drain (typically 2.4 m). In this way the device of the invention can be retrofitted in a storm water drainage system by removing one of the pipes and replacing it with the separator 2 of the invention.

The inlet 6 may include a longitudinally extending vane 12. The vane 12 is mounted on a mounting plate 14 which is fixed to the top inner surface of the inlet 6, as best seen in FIG. 3. The mounting plate 14 may be screwed or bolted to the inlet 6. Alternatively, the inlet 6 could be cut longitudinally and the vane 12 inserted through the cut and held in position by means of a flange or the like which is external to the inlet 6. Because the vane 12 extends in a radial direction relative to the inlet, it tends to substantially reduce turbulent flow in the inlet. When turbulent flow has been reduced in the inlet, any floating or buoyant bodies 16 which are entrained in the storm water carried by the inlet 6 tend to stop swirling and then occupy the upper part of the vane, as diagrammatically illustrated in FIG. 2. Any floating film of oil, scum, grease, fat or the like generally referred to as "oil" will also be removed. It is preferred that the leading edge of the vane 12 is tapered, as seen in FIG. 2 so as to minimise obstruction at the forward end of the vane. Further, it is preferred that the lower edge 18 of the vane extends near to the centre line of the inlet and preferably about 80% of the radius of the inlet. It is also preferred that the length of the vane 12 is greater than about three diameters of the inlet.

The chamber portion 4 includes a separating chamber 20 and a collecting chamber 22 separated therefrom by means of a separating wall 24. The separating chamber 20 includes ports 26 and 28 which provide fluid communication with the inlet 6 and outlet 8. The chamber 20 also includes a deflecting plate 30 which, as best seen in FIG. 1, extends generally diagonally across the chamber 20. The deflecting plate 30 preferably has an inclined lower edge 32, as best seen in FIG. 4. The plate 30 is preferably formed from galvanised steel sheet and is longer than the diagonal extent of the chamber 20 so that it is curved when mounted in the chamber 20, as seen in FIG. 1. The purpose of the deflecting plate 30 is to divert floating bodies 16 in the fluid flow towards the collecting chamber 22. The curved shape assists in this diversion. As best seen in FIG. 5, the separating wall 24 between the chambers 20 and 22 includes an opening 34 and the deflecting plate 30 deflects the bodies 16 through the opening into the interior of the chamber 22 which functions as a holding chamber for the bodies 16. It is preferred that the forward edge 35 of the opening 34 is inclined relative to the vertical so that the opening 34 is wider at its top so that bigger floating bodies 16 can pass therethrough. The narrower opening at the bottom assists in retaining collected articles in the chamber 22 when the level of the water therein falls.

It will be seen from FIG. 5 that the lower edge 32 of the deflecting plate 30 is lower than the top of the port 26 and its top edge 36 is above the level of the top of the port 26. Further, the top edge 38 of the opening 34 is above the level of the top edge 36 of the deflecting plate so as to facilitate passage of larger floating bodies 16 into the collecting chamber 22. Thus the plate 30 has a skimming action on floating bodies 16 in the chamber 20 and deflects these laterally towards the chamber 22.

It is preferred that the chambers 20 and 22 be square in cross-section, the length of the sides being about twice the diameter of the inlet 6. A lid 23 is provided to close the tops of the chambers 20 and 22.

FIGS. 7 to 11 illustrate an alternative form of the invention. This form of the invention is similar to that illustrated in FIGS. 1 to 6 and accordingly the same reference numerals have been used to denote corresponding parts. The main difference in this arrangement concerns the deflecting plate. In this arrangement, the deflecting plate 50 is hingedly connected to the interior of the chamber 20 so as to pivot about a horizontal axis 52. The hinge connection enables the deflecting plate 30 to be rotated by the flow of storm water to the position shown in broken lines in FIGS. 7 and 9 so as to reduce the effect of any flow restriction it may cause during times of high flow rates, as indicated by the high water level 54. It will, of course, be less effective in this position compared to its position when there is a low flow rate as indicated by low water level 56. In this arrangement, the side edges 58 and 60 of the plate 50 are inclined relative to the leading edge 36 so that the side edges will clear the adjacent edges of the chamber 20 when the plate is pivoted upwardly, as shown in FIG. 7.

In the arrangement shown in FIGS. 7 to 11, an auxiliary, deflecting plate 62 is connected at the top edge 36 of the plate 50, as best seen in FIG. 10. The plate 62 is at a predetermined angle relative to the plate 50 and in the illustrated arrangement the plates are perpendicular but this may be varied in accordance with requirements. The secondary plate has two functions. First, it acts as a counter-weight to keep the vane 12 in a generally vertical plane against the deflecting force of the flow of storm water in low flow conditions, as indicated by the low water level 56 in FIG. 9. In that arrangement the flow of water will tend to rotate the plate 50 clockwise and this is countered by the torque applied by the plate 62.

Under conditions of high flow, as indicated by the high water level 54 in FIG. 9, the plate 50 will be rotated so that it occupies a generally horizontal position as indicated in broken lines in FIG. 9. In this arrangement, the secondary plate 62 will be rotated so that it lies in a generally vertical plane and it will then function as the main deflecting plate which deflects floating bodies towards the opening 34. The horizontal axis 52 is located at about the same level as the tops of the inlet 6 and outlet 8 so that the high water level 54 will be usually slightly above the position of the axis 52, as shown in FIG. 9. This will accordingly ensure that the auxiliary plate 62 will act on the upper layers of the water flowing through the chamber 20 so as to deflect floating bodies through the opening 34.

As best seen in FIG. 11, the side edges 64 and 66 of the secondary plate 62 are inclined so as not to interfere with the sidewalls of the chamber 20 under conditions of low flow. The free edge 68 is inclined relative to the top edge 36 so that under high water level conditions in the chamber 20, the auxiliary plate 62 will have a greater vertical dimension at its end which is close to the opening 34 compared to the vertical dimension at the other end. This facilitates transport of floating bodies into the chamber 22.

It is envisaged that the secondary plate 62 will have a depth of about 20% to 40% of the depth of the plate 50.

In use floating bodies 16 will be deflected by the deflecting plate 30 through the opening 34 into the chamber 22. When the level of storm water falls in the inlet 6, the level of water will also fall in the chambers 20 and 22. The bodies 16 which have accumulated in the chamber 22 will tend to remain therein because the opening 34 is much narrower at its bottom than at the top. It is preferred that the length of the opening 34 in the longitudinal direction is about 200 mm at its top edge and about 50 mm at its bottom edge.

The separator 2 can be made in various sizes but it is envisaged that the diameter of the inlet 6 would be in the range 400–1000 mm.

The embodiments described above have been concerned with removal of floating bodies from storm water. It is possible, however, that the principles of the invention could be used to remove floating material from other types of fluids such as in industrial processes or the like. It will also be appreciated that the principles of the invention could be applied to removal of non-buoyant bodies. Non-buoyant bodies also tend to swirl about when there are conditions of turbulent flow and the device of the invention can be used to cause the non-floating bodies to fall to a lower region of the inlet where they can more effectively be removed.

FIGS. 12 to 16 illustrate an alternative embodiment of the invention which is capable of removing both floating material and non-buoyant material. In these Figures, similar reference numerals have been used to denote corresponding parts where appropriate. Generally speaking, the chamber portion 4, inlet 6 and outlet 8 are the same as in the previous embodiments except that the inlet 6 is inclined at an angle A in the range 20° to 50° relative to the separator body. The preferred range for the angle A, however, i; 15° to 45° and most preferably the angle A is 22.5°. Further, the deflecting plate 30 is replaced by means of a deflecting boom 70 which will float on water in the chamber 20. The boom 70 comprises a cylindrical body which is carried by mounting arms 72. The boom 70 can be fabricated from a length of PVC pipe such as a 300 mm diameter sewerage pipe. Sealed end pieces 71 can be provided in the ends of the boom in order to make it water tight and if necessary any weighting can be added to the interior of the boom in order to attain the required average density. In a further improved form of the boom, the boom 70 may be mounted for rotation about its own axis on the ends of the arms 72. This could assist in clearance of relatively large floating bodies. In other words, a rotatable boom 70 is less likely to be obstructed by larger floating bodies 16. The shape of the boom can be adjusted or weighted to get the correct floating position.

Figure 16:
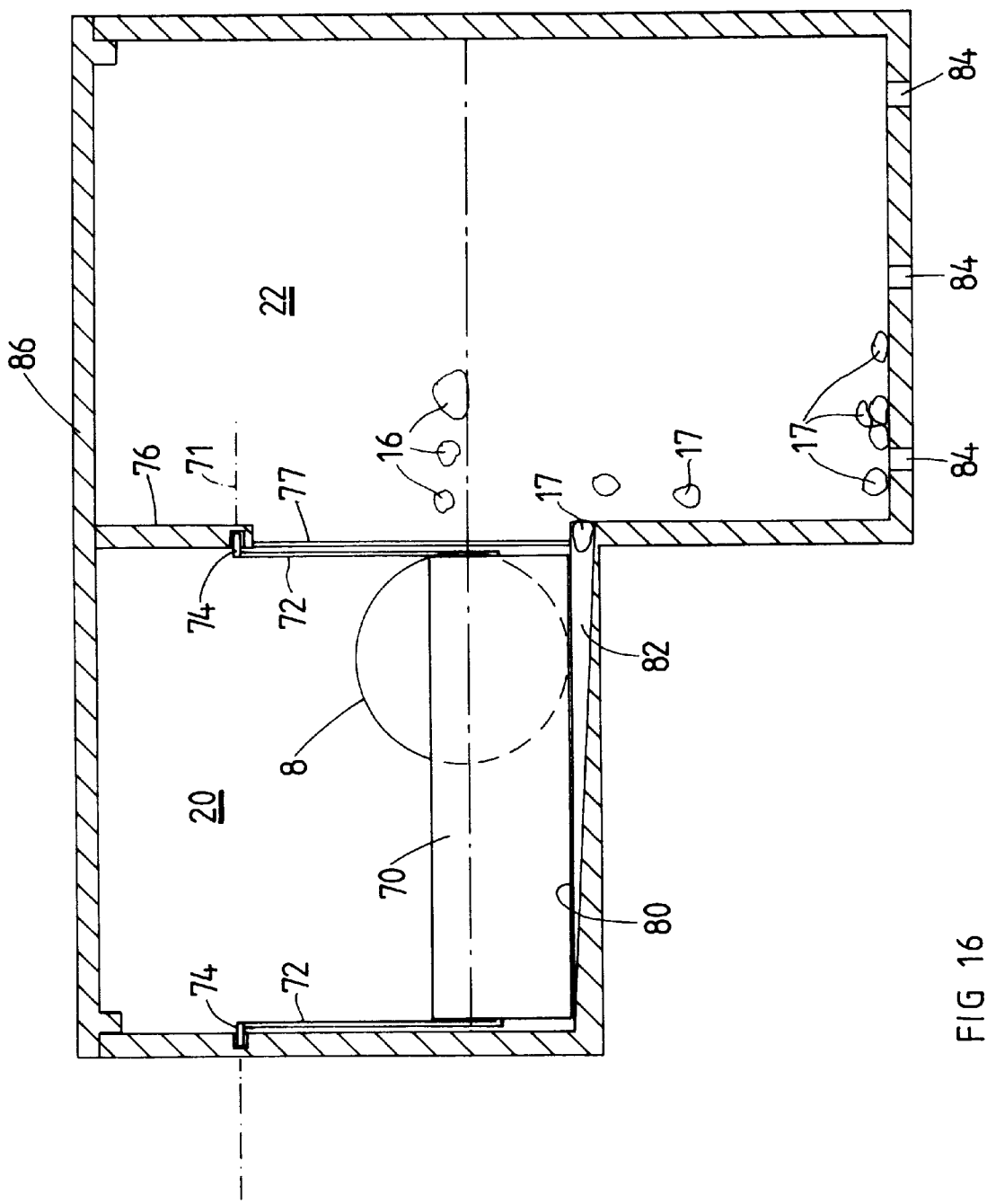
FIG. 16 is a schematic sectional view along the line 16—16.

The ends of the mounting arms 72 include pivot shafts 74 so that the boom 70 can be mounted for pivotal movement in the separating chamber 20 about an axis 71. One of the shafts 74 can be directly mounted in the concrete side wall of the chamber whereas the other shaft 74 can be mounted in a curtain wall 76 which extends between the chambers 20 and 22 but is well above the level of the floor 80 of the chamber 20, as seen in FIG. 16. The arms 72 are made from robust material such as stainless steel and arranged so that the average density (of the boom and arms) is less than water. The arrangement is such that the boom 70 will be submerged to a depth between say 50% and 85% of its diameter (or vertical dimension) when there is sufficient water in the chamber 20 before it begins to float. The arms 72 are upswept so as to minimise contact with floating bodies. The pivot point of the arms 72 is preferably at least 100 mm above the high water level 54.

Figure 14:
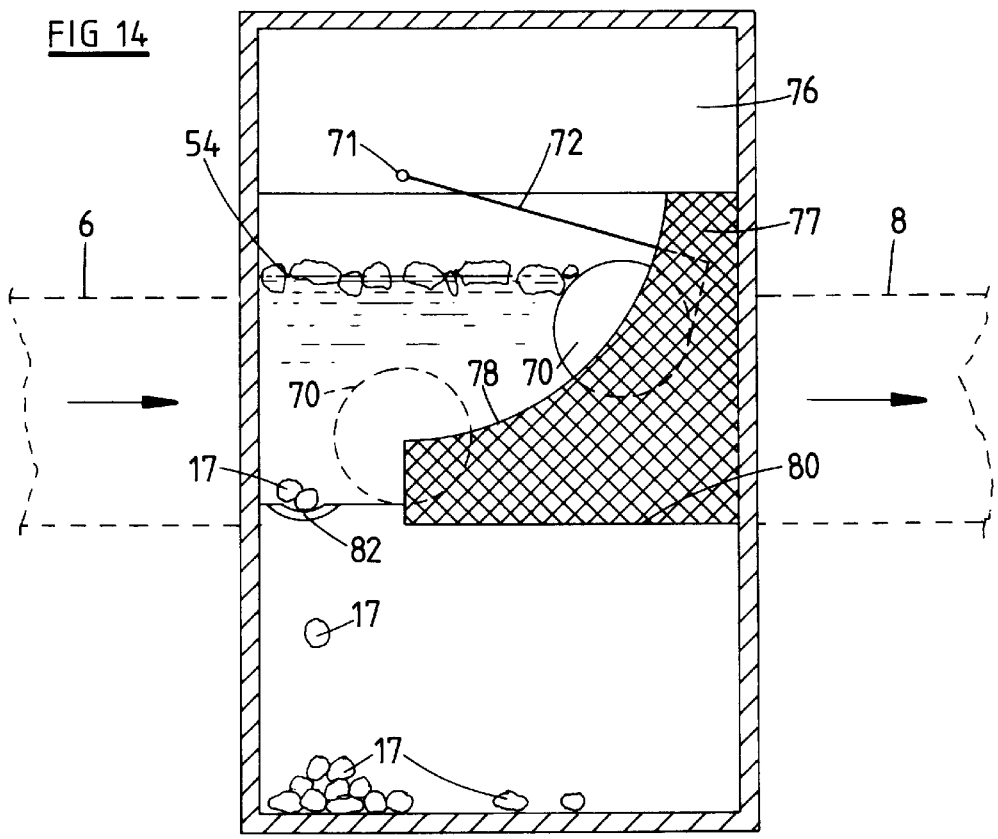
FIG. 14 is a schematic cross-sectional view along the line 14—14.
Figure 15:
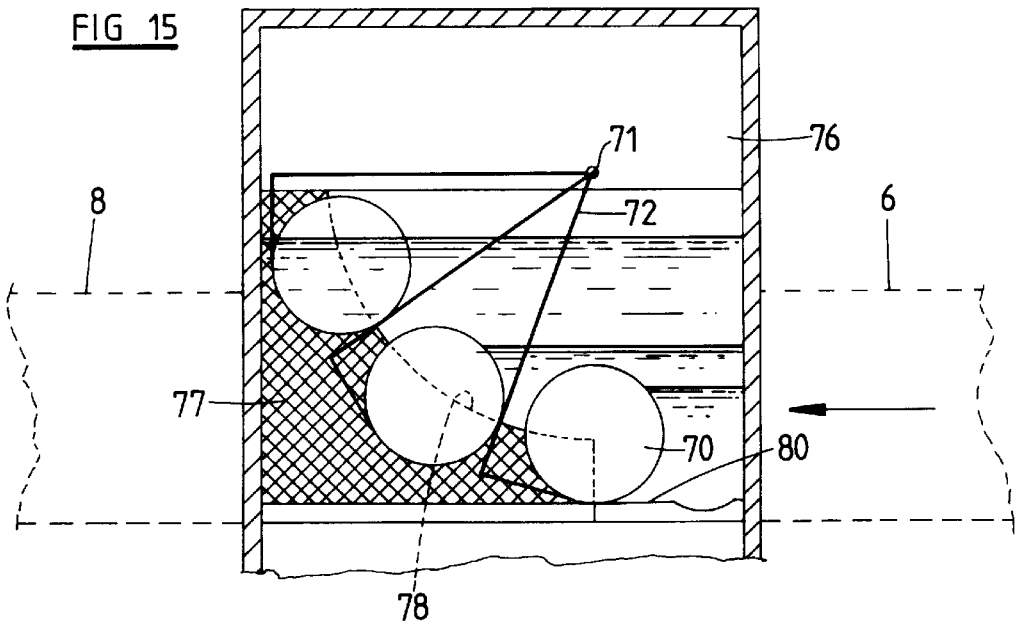
FIG. 15 is a schematic sectional view along the line 15—15.

As seen in FIGS. 14 and 15, the curtain wall 76 includes a screen 77 which is perforated so as to permit water to flow from the chamber 22 back through the chamber 20 to the outlet 8. The screen 77 is made of mesh or perforated metal or the like. The perforations are, however, small enough to trap large floating bodies 16 and these will be prevented from re-entering the separator chamber and also lodging behind the boom 70 where they could foul its operation. As seen in FIGS. 14 and 15, the leading edge 78 of the curtain wall 77 is circular in shape and follows the locus of the centre of the boom 70 about its pivot point in the separator. This ensures that the bodies 16 will be deflected laterally into the chamber 22 and not permitted to pass to the outlet 8.

FIG. 14 shows the position of the boom 70 with a high water level 54 corresponding to when the inlet 6 is filled with water. FIG. 15 shows the boom with lower levels of water in the chamber 20. When the chamber 20 is empty, the boom 70 will rest upon the floor 80 of the chamber 20, as shown in FIG. 14. The boom 70 is heavy enough to remain in this position during a first flush of storm water when a major part of litter and debris is normally carried along the inlet 6. As this material enters the pit, it is deflected by the angularly inclined boom and deflected laterally into the chamber 22. In this stage of the operation, the boom 70 is capable of deflecting non-buoyant bodies 17 laterally into the chamber 22, as diagrammatically shown in FIGS. 14 and 16. In order to facilitate lateral deflection of non-buoyant bodies 17, the floor 80 of the chamber 20 is provided with a spooned groove 82 which increases in width and depth across the chamber 20 towards the chamber 22, as best seen in FIG. 12.

Thus, the separator shown in FIGS. 12 to 16 is capable of removing buoyant bodies 16 and non-buoyant bodies 17 from the flow in the inlet 6. These bodies will be collected in the chamber 22. It is preferred that the chamber 22 includes drainage holes 84 in its bottom so that water will gradually drain out of the chamber 22. This avoids accumulation of stagnant water and facilitates periodic cleaning of the chamber 22 by removal of the lid 86 so as to vacuum out or otherwise remove the material which has accumulated in the chamber 22.

Figure 17:
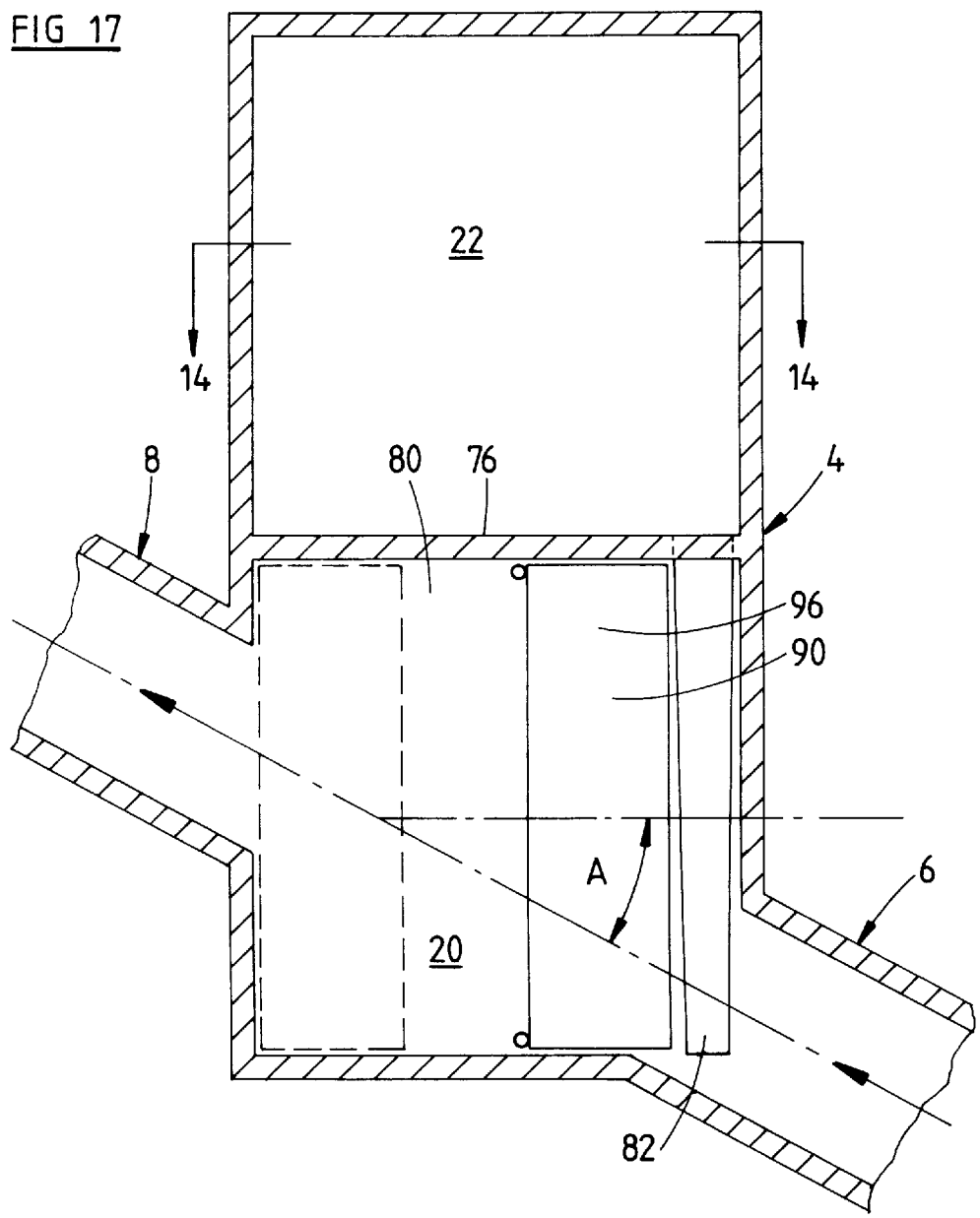
FIG. 17 is a schematic plan view of an alternative embodiment.
Figure 18:
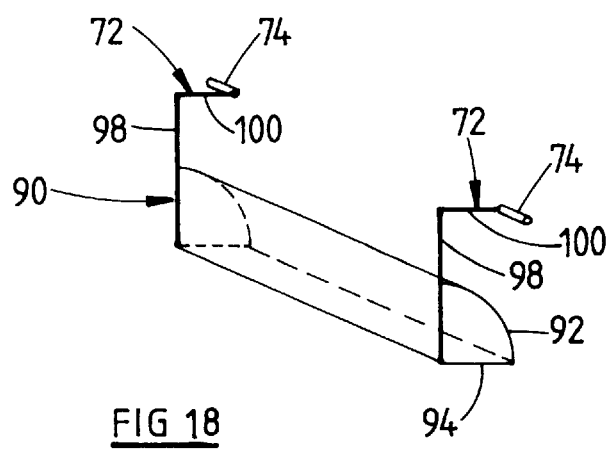
FIG. 18 is a schematic view of the boom of the embodiment of FIG. 17.
Figure 19:
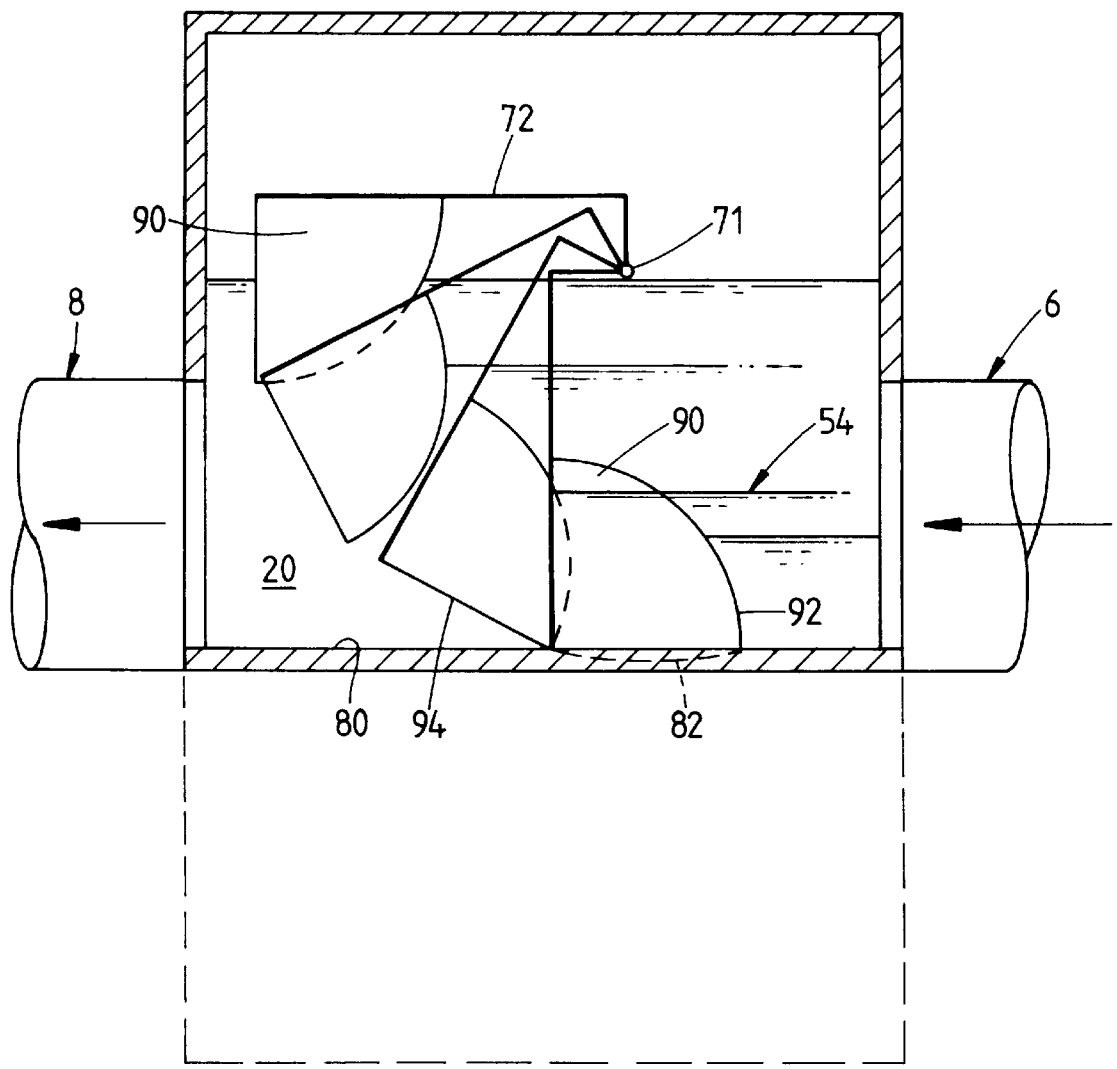
FIG. 19 is a fragmentary side view of the embodiment of FIG. 17.

FIGS. 17 to 19 illustrate an alternative form of the invention. This form of the invention is similar to that shown in FIGS. 12 to 16 and the same reference numerals have been used where appropriate.

The major difference between the embodiment of FIGS. 17 to 19 and that of FIG. 12 is that it includes a boom 90 which, in transverse section, has the shape of a quadrant of a circle. As seen in FIG. 19, when the boom 90 is in its lowermost position, its curved face 92 is inclined towards the inlet 6. This assists in deflecting floating bodies 16 upwardly and then laterally into the chamber 22. The quadrant shape is advantageous because when the boom is partially immersed in water within the chamber 20, an inclined face will be presented to floating bodies and the inclined face will of course continue to be presented even as the boom 90 rotates upwardly, as diagrammatically illustrated in FIG. 19.

It is thought that early in a storm, non-buoyant bodies will be flushed along the pipeline and will strike the boom when it is in its lowest position. The boom will cause the non-buoyant bodies 17 to pass along the groove 82 into the chamber 22. The bottom face 94 of the boom 90 is normally adjacent to the floor of the chamber 20. Ir this arrangement, the groove 82 is radiused so as to permit rotation of the boom 90, as diagrammatically illustrated in FIG. 19.

Figure 13:
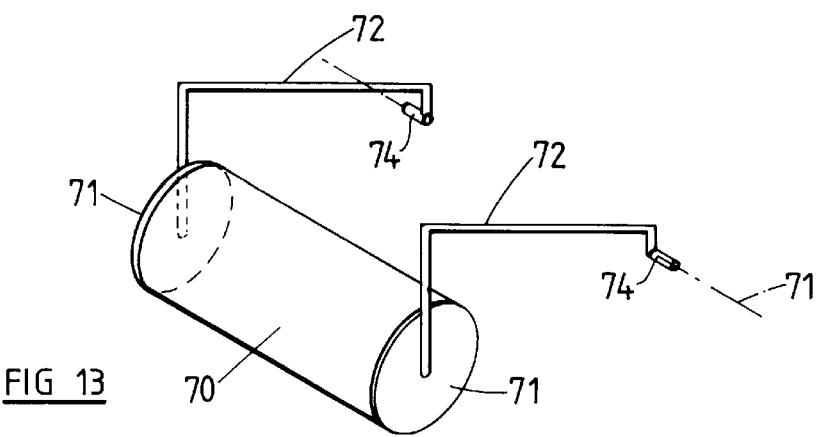
FIG. 13 is a schematic view of a boom for the embodiment of FIG. 12.

As can be seen from FIG. 18, in this embodiment the arms 72 are much shorter than those illustrated in FIG. 13. This is an advantage where the separator is to be used in situations where the stormwater pipe is not far beneath the surface of the ground. In these cases, the shorter arm 72 will not interfere during rotation thereof with the cover 86. In the illustrated embodiment, the arms 72 includes an upright leg 98 preferably 280 mm in length, the horizontal legs 100 of the arms 72 being about 50 mm in length. In practice, the actual sizes will vary according to the size of the installation but it is generally preferred that these parts of the arm have approximately the same relative proportions.

It will also be seen from FIG. 18 that the inlet 6 is formed at a corner of the chamber 20. Preferably, the angle A is in the range 15° to 45° and most preferably the angle A is 225°. It is also preferred that a side edge of the inlet 6 is generally aligned with the side edge of the bottom of the curved face 92. It is thought that this facilitates deflection of buoyant and non-buoyant bodies into the chamber 22. In one preferred form of the invention, the boom 90 can be made from part of a log of pine wood having a radius of 140 mm. Wood is particularly suitable for the material of the boom because it has a density such that normally about two-thirds of it will be submerged, as diagrammatically illustrated in FIG. 19. Also, wood is cheap and robust.

Figure 20:
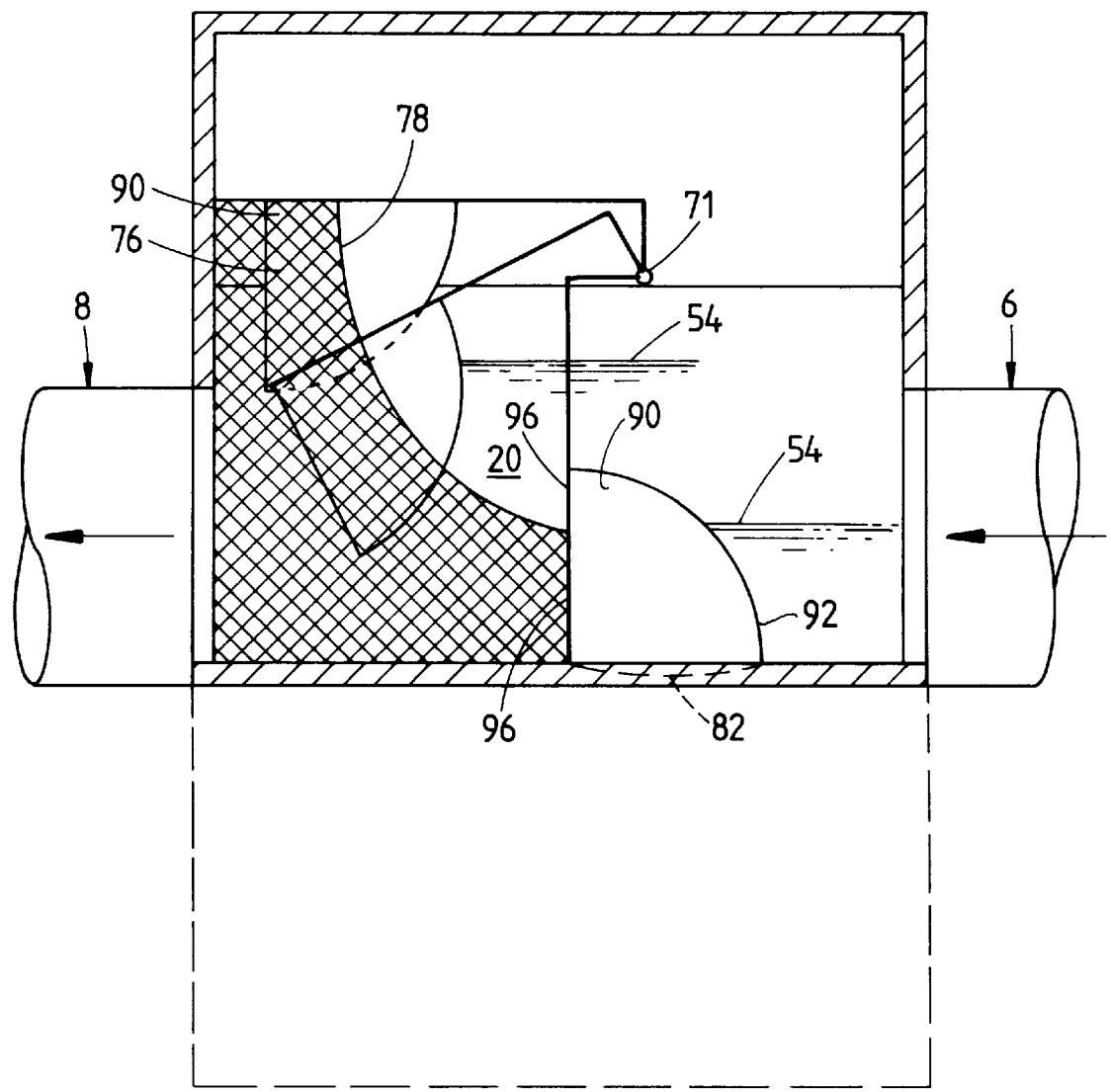
FIG. 20 is a further fragmentary side view of the embodiment of FIG. 17.

FIG. 20 is similar to FIG. 19, except that it shows the position of the screen 77. In particular, it will be noted that the leading edge 78 of the screen commences adjacent to the rear face 96 of the boom, when the boom is in its lowermost position. It will be seen also that the leading edge 78 includes a curved portion and a vertically extending portion 98 which lies adjacent to the rear face 96 of the boom. The vertical portion 98 is approximately three-quarters of the height of the vertical face 96.

In the embodiment illustrated in FIGS. 17 to 20, the inlet 6 and outlet 8 are inclined at an angle A relative to the structure of the separating chamber 20 and collecting chamber 22 together with the boom 90. Generally the same result can be obtained by arranging for the inlet 6 and outlet 8 to be generally in line with the chamber portion 4 and arrange for the boom to be inclined relative to the direction of fluid flow through the chamber. An embodiment utilising this principle is diagrammatically illustrated in FIGS. 21 to 24.

Figure 26:
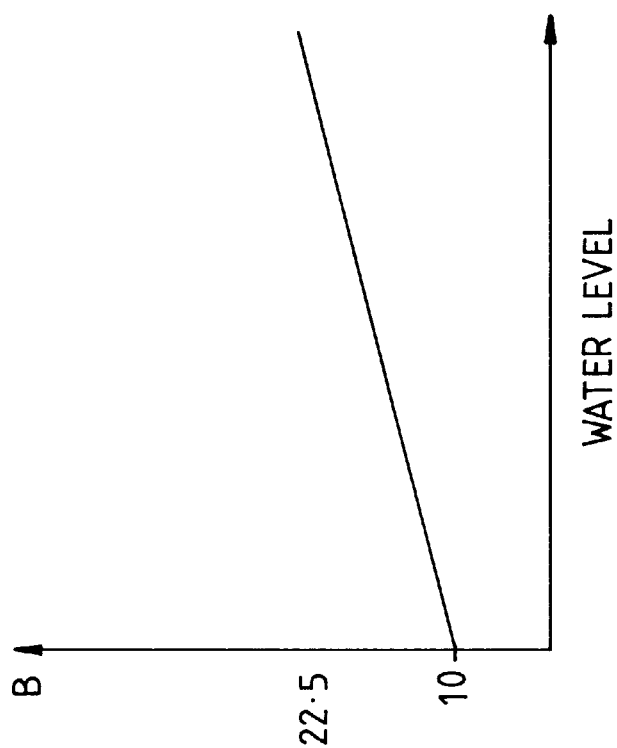
FIG. 26 is a graph showing the inclination of the water level lines as a function of water level.
Figure 25:
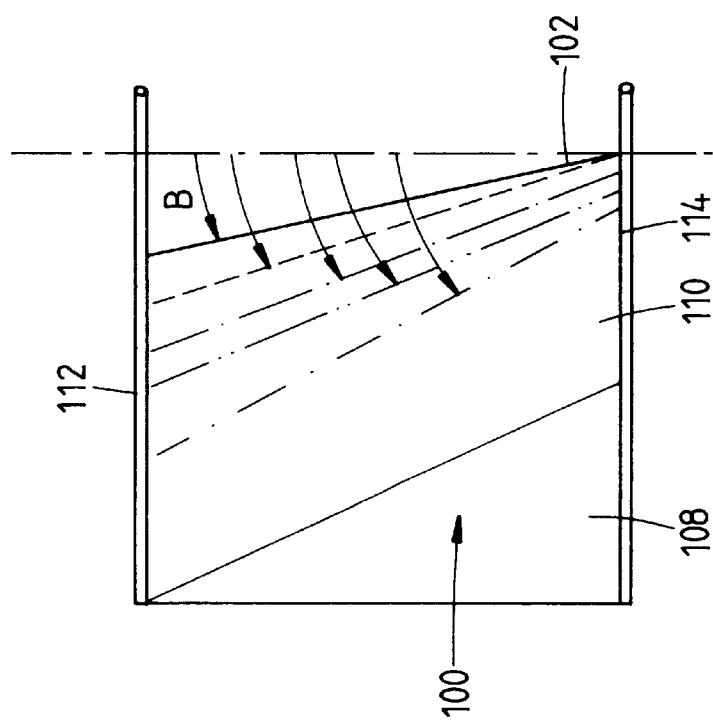
FIG. 25 is a schematic view showing the boom with different water level lines marked thereon.

In this arrangement, the boom 100 has a leading bottom edge 102 which is inclined at an angle B to a plane 104 transverse to the direction of flow through the inlet and outlet 6 and 8. As best seen in FIG. 23, the boom 100 has a flat base 106 and a flat top surface 108. The surface 108 is generally triangular and a curved surface 110 extends from the top surface to the bottom edge 102. The narrow part of the top surface 108 is adjacent to the collecting chamber 22 so that, generally speaking, the curved frontal face 100 serves to deflect buoyant and non-buoyant bodies 16 and 17 towards the collecting chamber 22. As also can be seen from FIG. 23, the curved side edge 112 adjacent to the chamber 22 has a more gentle curve (i.e. larger radii of curvature) compared to the side edge 114 remote therefrom. This assists in deflecting buoyant bodies 16 towards the chamber 22. As best seen in FIG. 25, the change in curvature from side to side on the front face of the boom presents increasing angles B, as diagrammatically shown in FIG. 25. The angles B indicate the water level lines which water within the separating chamber 22 makes relative to the front face 110 of the boom, as the water level increases. This can be varied in accordance with requirements. When the water level is zero, the angle B is preferably about 10° and as the water level increases to near the top surface 108, the angle is about 22.5°. The relationship is approximately linear, as diagrammatically illustrated in FIG. 26. It is preferred that the boom 100 is made from material having a specific gravity of about 0.8. One suitable material for this would be a solid pine log which has been rot proofed. It will be appreciated from the foregoing that as the water level increases, the effective inclination of the curved front face 110 at water level increases. This assists in deflecting floating materials laterally to the collecting chamber 22.

In order to minimise head losses through the device, particularly at higher flow conditions, it is preferred to arrange for the cross-sectional flow area available to the storm water within the chamber 20 approximately the same as the cross-sectional flow area of the inlet and outlets 6 and 8. In FIG. 24, this can be arranged by making the effective transverse flow area w×h to be equal to the cross-sectional area of the inlet 6 or outlet 8, where h is the height of the base 106 of the boom (at full flow conditions) above the floor 80 and w is the width of the chamber 20.

This embodiment may also be provided with a curtain wall 76 or baffle to prevent buoyant material from being caught behind the rear face of the boom 100.

Figure 27:
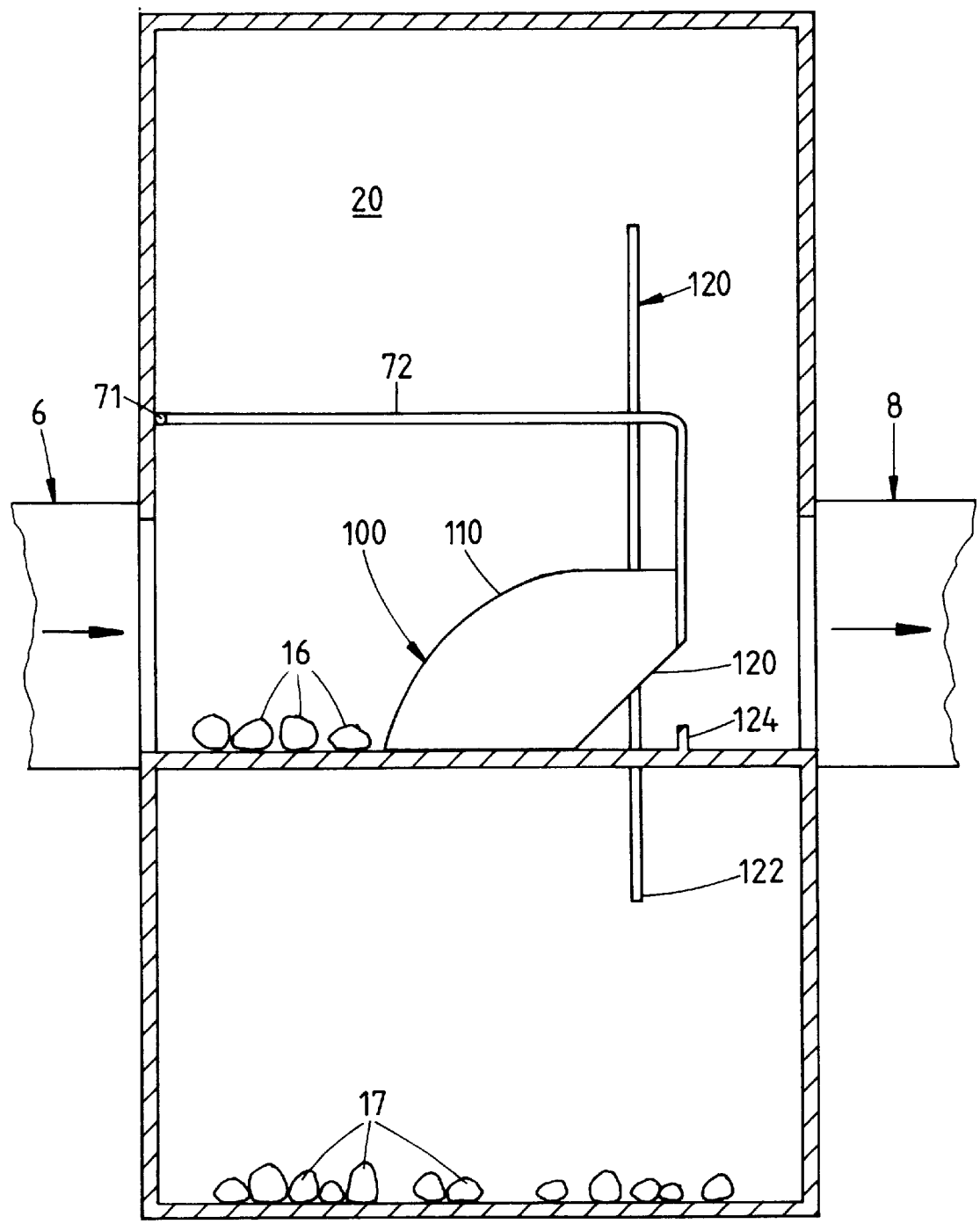
FIG. 27 is a schematic side view of a further embodiment of the invention.
Figure 28:
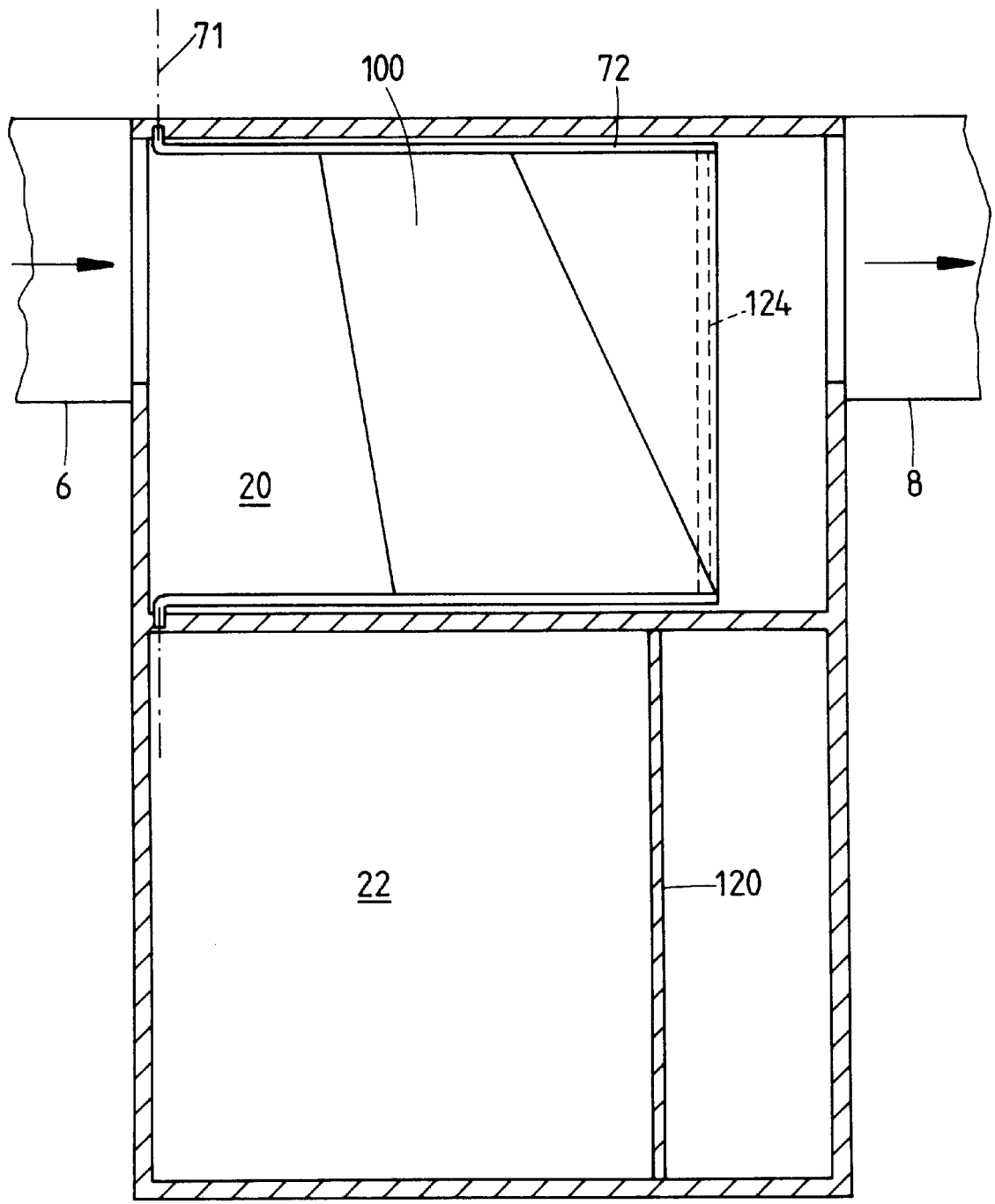
FIG. 28 is a schematic plan view of the embodiment of FIG. 27.

FIGS. 27 and 28 illustrate further modifications of the invention. In this embodiment the same reference numerals have been used to denote parts which correspond to those in FIGS. 21 to 23. In this embodiment, a transverse baffle 120 is provided in the collecting chamber 22. The lower edge 122 of the baffle extends transversely across the chamber 22 at a sufficient depth beneath the floor 80 to minimise the possibility of floating materials passing beneath it to the outlet 8. It will be appreciated that when the chamber 22 is filled with water, floating bodies 17 cannot pass the transverse baffle 120 because they would need to move beneath the surface level of the water in order to clear the lower edge 122 of the baffle.

FIGS. 27 and 28 also show another modification of the invention. In these drawings the screen 77 has been omitted for clarity of illustration. This is the provision of a barrier strip 124 transversely across the floor 80 of the chamber 20 between the rear part of the boom 100 and the outlet 8. The strip 124 simply prevents oil or the like draining or seeping into the outlet 8 during low flow conditions. The strip 124 could be fixed to the base 106 of the boom near the rear edge thereof so as to contact the floor 80 and one of its ends is close to the baffle 120. The strip may have a height of S to 15 mm and preferably 10 mm.

Figure 29:
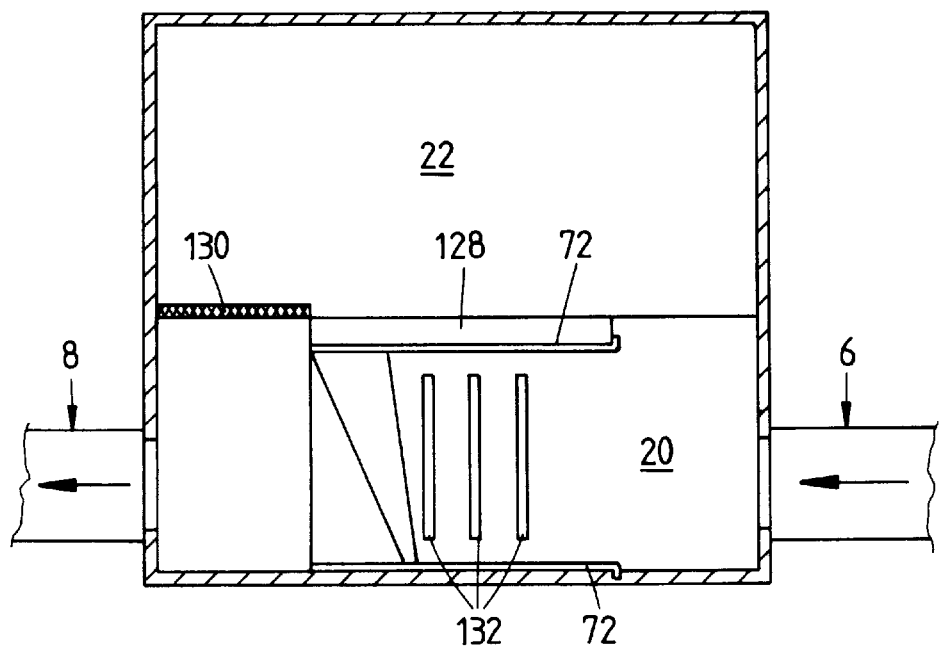
FIG. 29 is a schematic plan view of a further embodiment of the invention.
Figure 30:
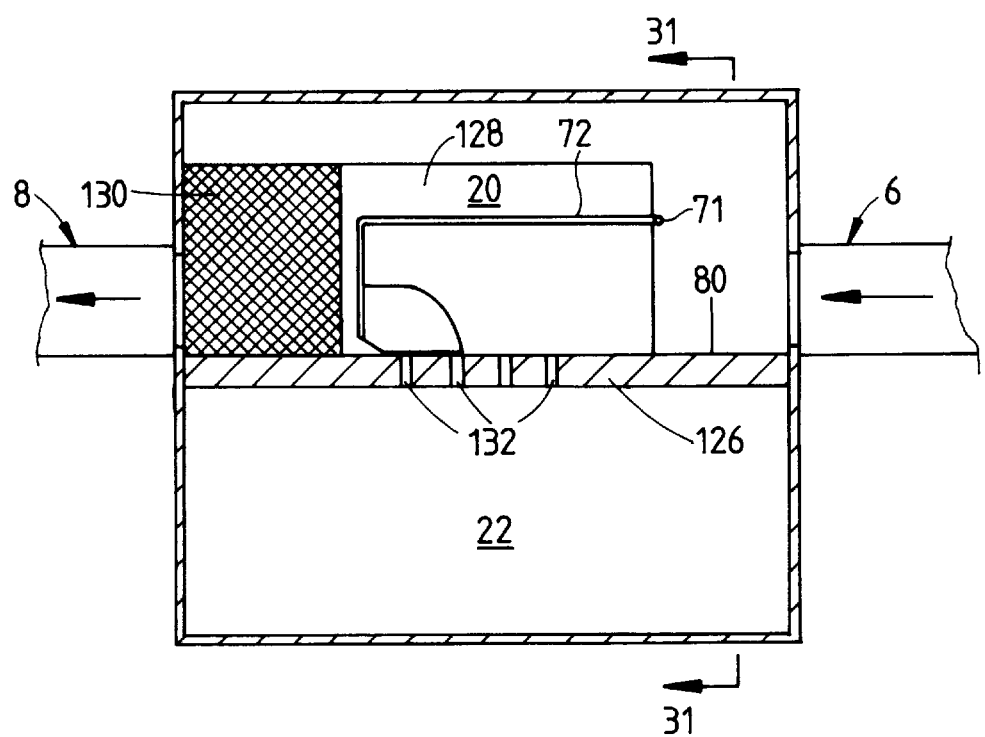
FIG. 30 is a schematic side view of the further embodiment.
Figure 31:
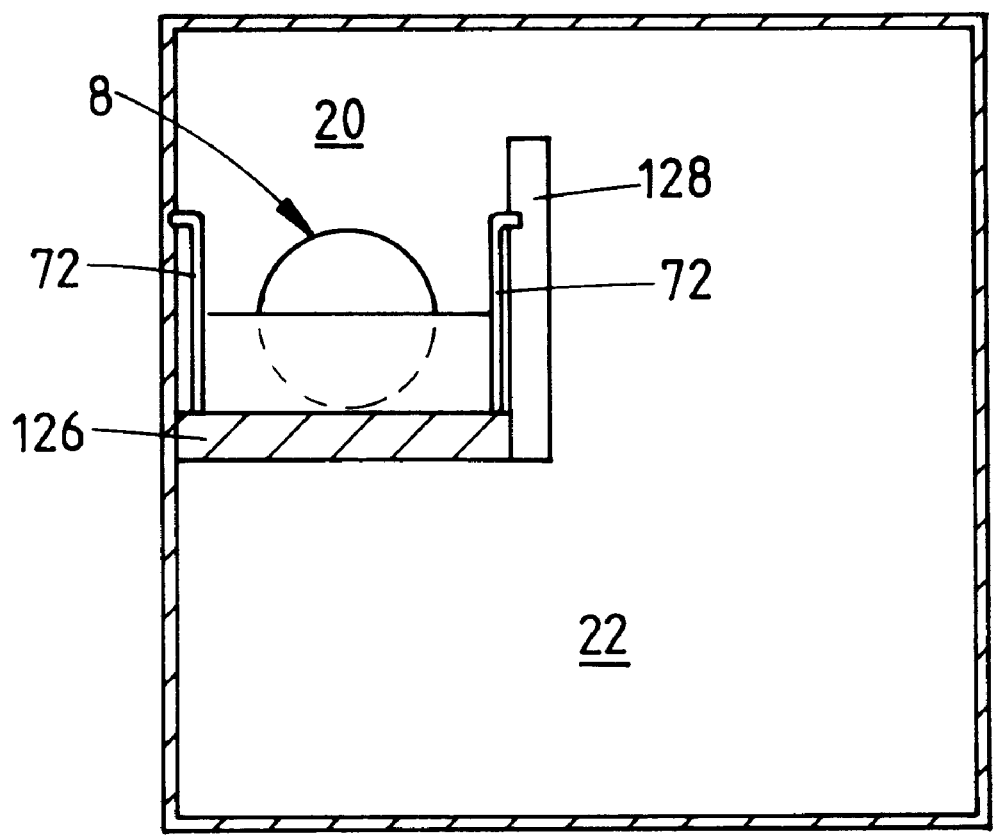
FIG. 31 is a schematic sectional view along the line 31—31.

FIGS. 29 to 31 illustrate a modified form of the invention. This form of the invention is essentially the same as that shown in FIGS. 17 to 23 except that the chamber 20 is defined as a compartment within the holding chamber 22. In this configuration the holding chamber 22 is essentially of cuboid form and is thus easy to manufacture and instal. The chamber 20 is defined by a horizontal shelf 126, the upper surface of which constitutes the floor 80. A sidewall of the chamber 20 is defined by a vertical wall 128. The wall 128 provides a pivot point for one of the arms 72. A baffle 130 is provided between the rear part of the wall 128 and the outlet 8 so as to prevent floating bodies 16 entering the outlet 8. The shelf 126 may be provided with slots or openings 132 to permit fine solid materials or other residues to pass therethrough so as to avoid accumulation on the floor 80. The openings 132 may be provided in other embodiments of the invention as well.

Figure 32:
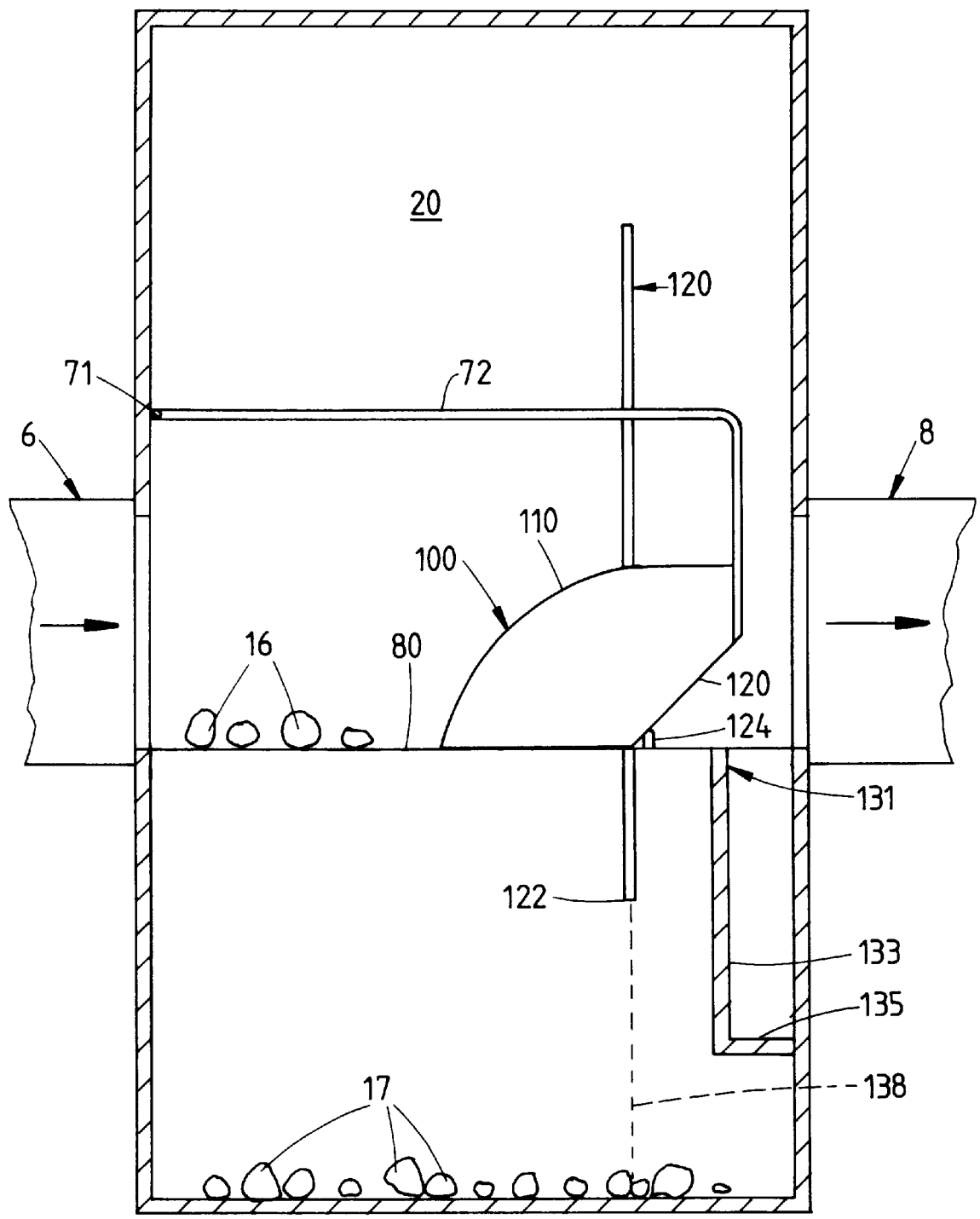
FIG. 32 is a schematic side view of a further embodiment of the invention.
Figure 33:
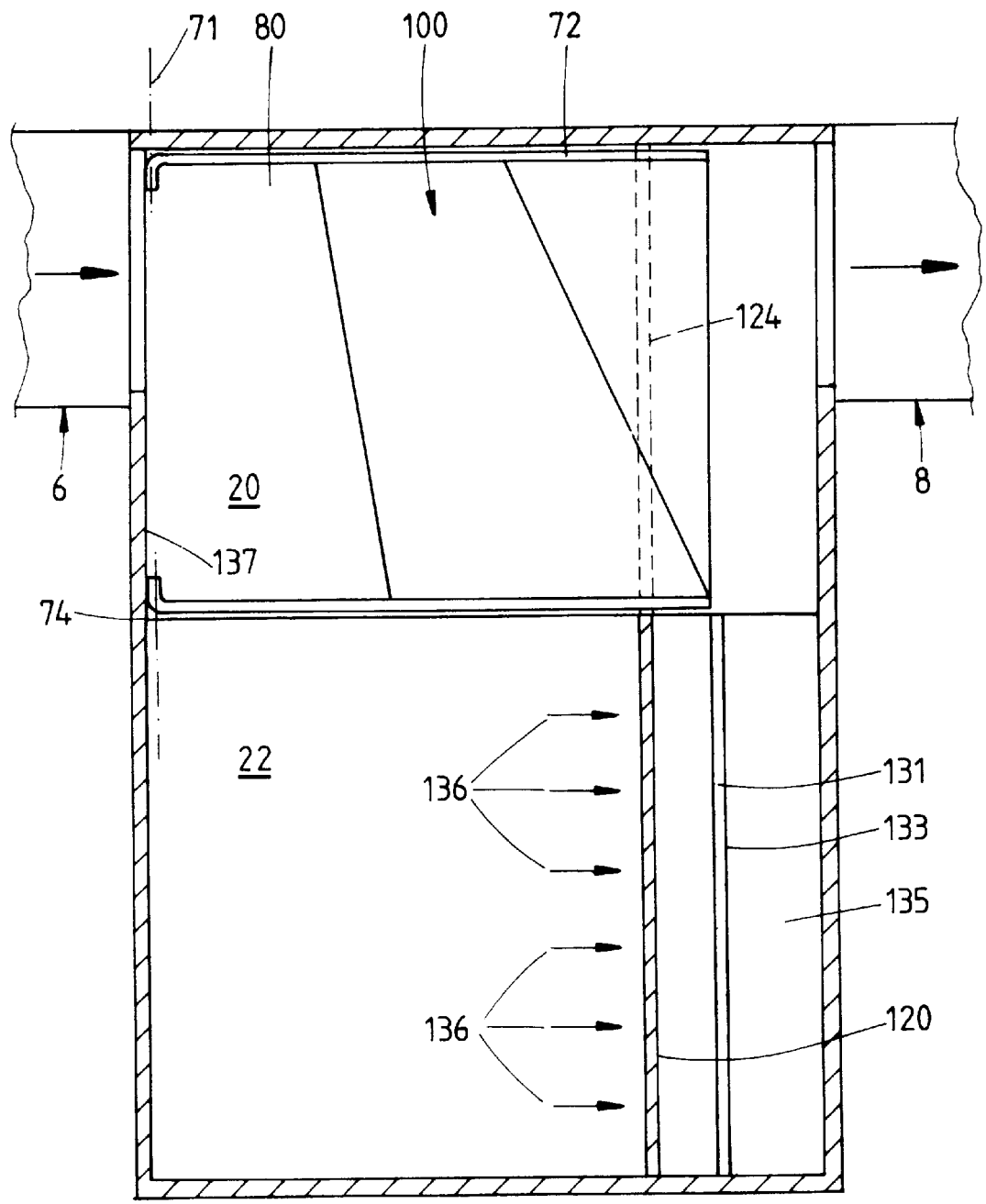
FIG. 33 is a schematic plan view of the arrangement shown in FIG. 32.

FIGS. 32 and 33 illustrate a further embodiment of the invention. This embodiment is generally similar to that illustrated in FIGS. 27 and 28. The same reference numerals have been used to denote corresponding parts where appropriate.

FIGS. 32 and 33 also illustrate a further modification of the invention. This embodiment includes the provision of a weir 131 in the holding chamber 22. The purpose of the weir 131 is to reduce the values of upward components of velocity in fluid flow from the chamber 22 to the outlet 8 which might tend to uplift bodies or material submerged in the chamber 22. The weir is formed at the top of a transverse vertical wall 133 and horizontal wall 135. It will be noted from FIG. 32 that the top of the weir 131 is at about the same level as the floor 80. Although it is not shown in the drawings, the top edge of the vertical wall 133 may be sloped so as to help promote more even flow as indicated by flow lines 136 in FIG. 33. This can be accomplished by arranging for the height of the wall 133 to be higher adjacent to the floor 80 compared to the distal part thereof. In this embodiment the arms are pivotally mounted on the upstream wall 137 of the chamber 20 giving the advantage of a longer radius of rotation of the boom 100.

Alternatively, a screen 138 can be provided to extend from the baffle 120 to the floor of the chamber 22. The provision of the screen 138 should have the effect of minimising transport of materials from the floor of the chamber 22 into the outlet 8.

In this embodiment, the barrier strip 124 is mounted on or adjacent to the base 106 of the boom 100. When the boom 100 is in a non-buoyant state, the strip 124 engages the floor 80 of the chamber 20 to thereby prevent oil, scum or the like seeping or draining to the outlet 8.

The boom 100 illustrated in FIGS. 21 to 33 includes a chamfered lower rear face 120. The degree of chamfering from side to side across the boom can be varied in order to achieve the correct balance of the boom 100 when it is floating. In this respect there would be normally less chamfering on the side of the boom which is closest from the holding chamber 22.

Many modifications will be apparent to those skilled in the art without departing from the spirit and scope of the invention. For instance, in the illustrated embodiments, the boom is arranged to be pivotally connected to the structure by means of the arm 72. As the water level increases, the angle of inclination of the boom relative to the general flow through the device will change, as a result of the geometry. The arm 72 may be replaced by means of a parallel linkage which maintains the same orientation of the boom relative to the fluid flow during rotation, in other words the boom would be constrained by the parallelogram linkage so as to remain in a generally horizontal plane, even though it rises and falls owing to changes in water level.

Many further modifications will be apparent to those skilled in the art.

What is claimed is:

1. A separator for separating material from a fluid, said separator comprising:
   a molded body having an inlet, a separating chamber in fluid communication with the inlet, and a holding chamber at least part of which is laterally adjacent to the separating chamber;
   deflecting means for deflecting material entrained in or moving with fluid entering the separating chamber from said inlet towards said holding chamber; and
   an outlet for permitting flow of fluid from which said material has been removed from the separating chamber,
   wherein the deflecting means includes a boom which is mounted in the separating chamber for pivotal movement about an axis which is located between the boom and said inlet.

2. A separator as claimed in claim 1 wherein a lower part of the holding chamber is at a lower level relative to the separating chamber and said outlet.

3. A separator as claimed in claim 1 including a screen to prevent floating bodies in the holding chamber from re-entering the separating chamber.

4. A separator as claimed in claim 1 including a baffle extending transversely across the holding chamber, the baffle having a lower edge which is lower than the level of said outlet.

5. A separator as claimed in claim 1 wherein the separating chamber includes an oil deflecting strip which operates tc prevent oil seeping from the separating chamber to said outlet.

6. A separator as claimed in claim 1 wherein the boom has a specific gravity less than 1.

7. A separator as claimed in claim 6 wherein the specific gravity is about 0.8.

8. A separator as claimed in claim 6 wherein when said fluid comprises water and the boom is normally supported by a floor of the separating chamber until the boom is submerged by a predetermined amount.

9. A separator as claimed in claim 7 wherein said amount is a depth of 50% to 80% of a vertical dimension of the boom.

10. A separator as claimed in claim 1 wherein said axis is inclined relative to the direction of fluid movement in said inlet.

11. A separator as claimed in claim 1 wherein the boom includes a curved frontal face which is directed towards said inlet.

12. A separator as claimed in claim 11 wherein said axis is transverse to the direction of fluid movement in said inlet and said curvature of said frontal face varies along the length of the boom.

13. A separator as claimed in claim 12 wherein the variation of curvature is such that the effective inclination of the frontal face at the water line of water within the separating chamber increases as the water level in the separating chamber increases.

14. A separator as claimed in claim 3 wherein the screen forms part of a curtain wall and wherein said boom is mounted by means of arms at least one of which is pivotally connected to said curtain wall.

15. A separator as claimed in claim 14 wherein the arms are pivotally mounted upstream of said boom.

16. A separator as claimed in claim 10 wherein the axis is above the boom.

17. A separator for separating material from a fluid, said separator comprising:
   an inlet;
   a separating chamber in fluid communication with the inlet;
   a holding chamber;
   deflecting means for deflecting material entrained in or moving with fluid entering the separating chamber from said inlet towards said holding chamber; and
   an outlet for permitting flow of fluid from which said material has been removed from the separating chamber,
   wherein the deflecting means comprises a boom which is mounted in said separating chamber for pivotal movement about an axis which is transverse relative to the direction of fluid movement in said inlet, the boom includes a curved frontal face which is directed towards said inlet, and the curvature of the frontal face varies along the length of the boom.

18. A separator as claimed in claim 17 wherein the variation of curvature is such that the effective inclination of the frontal face at the water line of water within the separating chamber increases as the water level in the separating chamber increases.

19. A separator for separating material from a fluid, said separator comprising:

an inlet;

a separating chamber in fluid communication with the inlet;

a holding chamber;

deflecting means for deflecting material entrained in or moving with fluid entering the separating chamber from said inlet towards said holding chamber, the deflecting means comprising a boom which is mounted in said separating chamber for pivotal movement about an axis;

an outlet for permitting flow of fluid from which said material has been removed from the separating chamber; and a screen to prevent floating bodies in the holding chamber from re-entering the separating chamber, wherein the screen forms part of a curtain wall, and the boom is mounted by means of arms at least one of which is pivotally connected to the curtain wall upstream of said boom.

20. A separator for separating material from a fluid, said separator comprising:

an inlet;

a separating chamber in fluid communication with the inlet;

a holding chamber;

deflecting means for deflecting material entrained in or moving with fluid entering the separating chamber from said inlet towards said holding chamber, the deflecting means comprising a boom which is mounted in said separating chamber for pivotal movement about an axis;

an outlet for permitting flow of fluid from which said material has been removed from the separating chamber; and a baffle extending transversely across the holding chamber, the baffle having a lower edge which is lower than the level of said outlet.

* * * * *